United States Patent [19]
West, Jr.

[11] Patent Number: 5,854,703
[45] Date of Patent: Dec. 29, 1998

[54] HYBRID FIBER COAX COMMUNICATIONS NETWORK

[75] Inventor: Lamar E. West, Jr., Maysville, Ga.

[73] Assignee: Scientific-Atlanta, Inc., Norcross, Ga.

[21] Appl. No.: 808,535

[22] Filed: Feb. 28, 1997

[51] Int. Cl.⁶ ................................................ H04B 10/00
[52] U.S. Cl. ...................... 359/167; 359/145; 359/173; 455/3.1; 348/6
[58] Field of Search ................................. 359/125, 128, 359/137, 147, 139, 145, 167, 173; 455/3.1, 6.1; 348/6

[56] References Cited

U.S. PATENT DOCUMENTS

| | | | |
|---|---|---|---|
| 3,750,022 | 7/1973 | Curry et al. | 325/53 |
| 3,924,187 | 12/1975 | Dormans | 325/52 |
| 4,494,138 | 1/1985 | Shimp | 358/86 |
| 5,126,840 | 6/1992 | Dufresne et al. | 358/86 |
| 5,153,763 | 10/1992 | Pidgeon | 359/125 |
| 5,262,883 | 11/1993 | Pidgeon | 359/125 |
| 5,317,392 | 5/1994 | Ishibashi et al. | 348/6 |
| 5,499,047 | 3/1996 | Terry et al. | 348/6 |
| 5,526,154 | 6/1996 | Pyhalammi | 359/125 |
| 5,528,582 | 6/1996 | Bodeep et al. | 370/24 |
| 5,537,142 | 7/1996 | Fenouil | 348/12 |

Primary Examiner—Kinfe-Michael Negash
Attorney, Agent, or Firm—Kelly A. Gardner; Kenneth M. Massaroni; Hubert J. Barnhardt, III

[57] ABSTRACT

A hybrid fiber coax communications system includes plural coaxial distribution plants, fiber optic nodes, fiber optic links and a headend. At least one subscriber is coupled to each coaxial distribution plant. In the upstream signal path, the upstream signals travel from the coaxial distribution plants to the fiber optic nodes and through the fiber optic links to the headend. In the headend, optical receivers receive each upstream signal and pass the signals to respective node switches. The node switches selectively connect the upstream signals to a demodulator. An element control manager provides a control signal to the node switches to control whether the switch is in an open or closed state. One of the switches can be selected to be closed so that the demodulator receives one of the upstream signals.

15 Claims, 4 Drawing Sheets

HYBRID FIBER COAX COMMUNICATIONS NETWORK

FIELD OF INVENTION

The invention generally relates to a broadband communications system network for distributing multimedia signals. More particularly, the present invention is directed to an architecture for communications systems which include a fiber optic and coaxial distribution network.

BACKGROUND OF INVENTION

Conventional coaxial broadband communication networks use tree-and-branch architectures also known as "trunk and feeder." The function of a coaxial trunk cable is to deliver broadband television signals from a headend to a plurality of distribution points. The distribution points are connected to feeder coaxial cables which emanate from the trunk coaxial cable and contain subscriber tap off devices. At the distribution points, the feeders are connected to the trunk at locations commonly termed trunk/bridger stations. The bridger locations (along with the headend and any hubs) are generally known as "star" focal points with feeder cables emanating in all directions therefrom.

A problem associated with conventional network architectures is reverse noise funneling. Forward signals travel from the headend to the subscriber and reverse signals travel from the subscriber to the headend. Two-way signaling is accomplished by frequency domain multiplexing techniques. Typically, spectral bandwidth is allocated for an RF frequency range of 5–40 MHZ for reverse path or upstream communications and 54–750 MHZ for forward path or downstream communications.

Noise from many potential sources is combined in upstream communications before the reverse signals reach the headend. The noise can mask reverse signals which are carried on the network. Conventional systems combat this problem by introducing bridger switches at key locations in the network. Bridger switches block signals traveling in the reverse direction while not affecting signals traveling in the forward direction. The switches are remotely controlled from the headend. During operation of the network, the switches are set to allow passage of desired signals from certain sections of the network while blocking noise from other parts of the network. Consequently, the resulting magnitude of the noise affecting the reverse signals received at the headend is greatly reduced. A conventional architecture is shown in FIG. 1 with a headend 1, bridger switches 2 and coaxial distribution plant 3.

In recent years, there has been a great deal of interest in the transmission of various types of information including, for example, television signals, via optical fibers. Optical fibers intrinsically have more information carrying capacity than coaxial cables used in present cable television systems. In addition, optical fibers are subject to less signal attenuation per unit length than coaxial cables adapted for carrying radio frequency signals. Consequently, optical fibers are capable of spanning longer distances between signal regenerators and amplifiers than coaxial cables. Furthermore, the dielectric nature of optical fiber eliminates the possibility of signal outages caused by electrical shorting or radio frequency pick-up. Finally, optical fiber is immune to ambient electromagnetic interference ("EMI") and generates no EMI of its own.

It is therefore desirable to provide an optical fiber cable to the home of each subscriber in a cable television system. Accordingly, conventional coaxial cable networks for distribution of television signals are being supplemented by optical fiber transmission paths and other equipment for communications of additional television and/or other signals, which may include bidirectional signals in digital form. Such fiber-to-the-home (FTTH) architectures provide the above-identified advantages of using fiber as well as providing sufficient bandwidth for each customer for anticipated data services.

Thus, a new style of a network is being used for carriage of two-way traffic today. In this network, optical fiber links replace certain parts of the conventional coaxial distribution plant. Each fiber optic link connects the headend to a node. One such network architecture is a fiber-to-feeder (FTF) system generally shown in FIG. 2. In its simplest form, an FTF system replaces the coaxial trunk system with optical fiber to what was a bridger location. Thus, in the FTF system of FIG. 2, optical fibers 20 couple a headend 10 to a plurality of fiber optic nodes 15. Fiber optic nodes 15 each include a transducer for transducing the received optical signals to corresponding RF signals which are output to a conventional coaxial plant which includes coaxial distribution lines 25 and a plurality of RF amplifiers 30.

The hybrid fiber/coax (HFC) network architecture receives a good deal of attention today for the carriage of two-way multimedia traffic. However, the new HFC architecture is not well accommodated by using conventional bridger switches for reducing noise effects in the upstream direction. It is generally known to switch in transmitting branches and switch out non-transmitting branches in a conventional tree and branch architecture as described above.

With the new HFC network architecture, multimedia signals are bidirectionally broadcast between the headend and subscribers. Two-way multimedia traffic brings added complexity such as the need to pass reverse traffic of one type from one part of the network, while simultaneously passing reverse traffic of another type from another part of the network. Thus, it becomes impractical to use the above described noise reduction techniques.

The new traffic requires multiple reverse traffic demodulators in the headend as shown in FIG. 3. Elements in FIG. 3 include coaxial distribution plants 100-1, 100-2, 100-3, . . . , 100-N, optical nodes 110-1, 110-2, 110-3, . . . , 110-N, fiber optic links 120-1, 120-2, 120-3, . . . , 120-N, headend 130, directional couplers 140-1, 140-2, 140-3, . . . , 140-N, and directional couplers 145-1, 145-2. Certain demodulators will be connected to only one node as indicated by demodulators A1, A2, through AN. Certain other types of demodulators B1, C1 will be connected in the headend to multiple nodes (in some cases this will be all nodes). Noise funneling is a problem for demodulators connected to multiple nodes. Thus, there is a need to develop a technique for reducing noise funneling in HFC networks.

SUMMARY OF THE INVENTION

The present invention overcomes the aforementioned problems by providing a technique for funneling noise associated with HFC networks. In HFC architectures according to the present invention, the bridger switch is relocated from the coaxial distribution plant to the headend. In the architecture, the devices which perform conventional bridger switch type functions are known as node switches. The node switches are substantially less complex than the bridger switch. In the HFC architecture, in contrast to conventional architectures, there is no need to pass forward signals while blocking reverse signals. Thus, where conventional bridger switches were remotely located and generally required an RF control link, the new node switches are co-located in the headend with other control electronics.

A hybrid fiber coax communications system according to an illustrative embodiment of the present invention includes a coaxial distribution plant including coaxial distribution lines, a plurality of nodes coupling to the coaxial distribution plant, a plurality of fiber optic links including at least one fiber optic cable, and a headend coupled to the nodes by ones of the fiber optic links. The headend includes optical receivers, each optical receiver for receiving an upstream signal from a corresponding one of the nodes, a first demodulator, selectively coupled to the optical receivers, for receiving one upstream signal at any given time from a first optical receiver, and a plurality of switches located in a signal path between the optical receivers and the first demodulator, a first switch being in a closed state to operatively connect the first optical receiver to the first demodulator, and second switches being in an open state to disconnect second optical receivers from the first demodulator. The headend may also include an element control manager, coupled to the switches, for generating a control signal to select the switch that is in the closed state. The headend can also have second demodulators, each second demodulator coupled to a corresponding one of the optical receivers and receiving the upstream signal. In addition, the headend may have directional couplers connected to optical receivers for routing the upstream signals to the switches and to the second demodulators.

According to an exemplary embodiment of the present invention, a headend for receiving upstream signals over a fiber optic link includes a first optical receiver for receiving a first upstream signal, a second optical receiver for receiving a second upstream signal, and a first demodulator, selectively coupled to the first and second optical receivers. The headend also has a first switch located in a signal path between the first optical receiver and the first demodulator, for operatively connecting the first optical receiver to the first demodulator in a closed state and disconnecting the first optical receiver from the first demodulator in an open state and a second switch located in a signal path between the second optical receiver and the first demodulator, for operatively connecting the second optical receiver to the first demodulator in a closed state and disconnecting the first optical receiver from the first demodulator in an open state.

In a headend, an illustrative method for processing upstream signals from a plurality of nodes according to the present invention includes several steps. The steps include receiving a first upstream signal from a first node and a second upstream signal from a second node, routing the first upstream signal to a first switch, routing the second upstream signal to a second switch, selectively coupling the first upstream signal to first demodulating circuitry when the first switch is in a closed state and the second switch is in an open state, and selectively coupling the second upstream signal to the first demodulating circuitry when the second switch is in a closed state and the first switch is in an open state.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION

The present invention is discussed below with reference to a broadband communications network. Also, the present invention will primarily be described with reference to an HFC network for purposes of illustration, although it should be understood that it can be applied to other communications networks.

Figure 1:
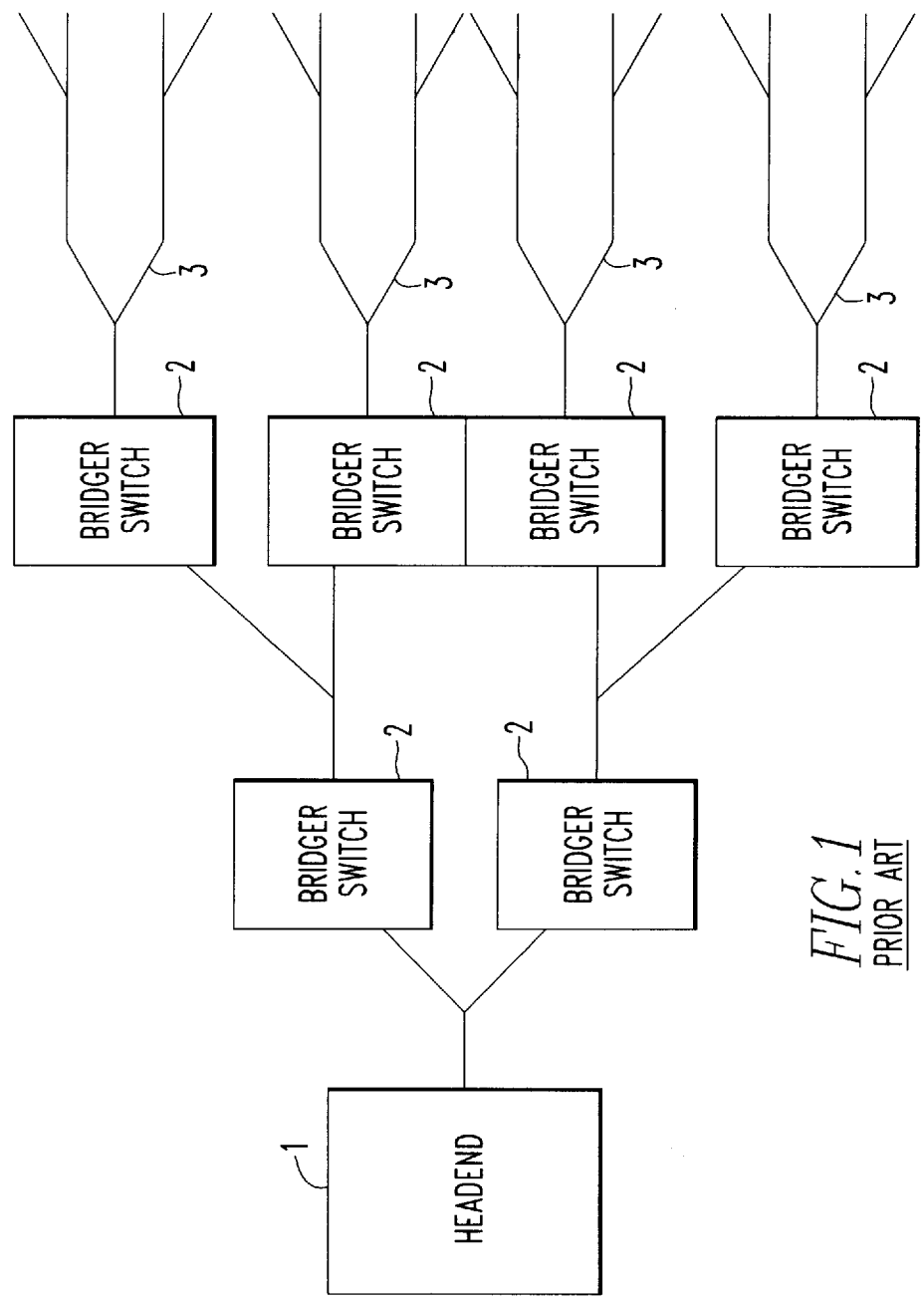
FIG. 1 shows a conventional coaxial network architecture.
Figure 2:
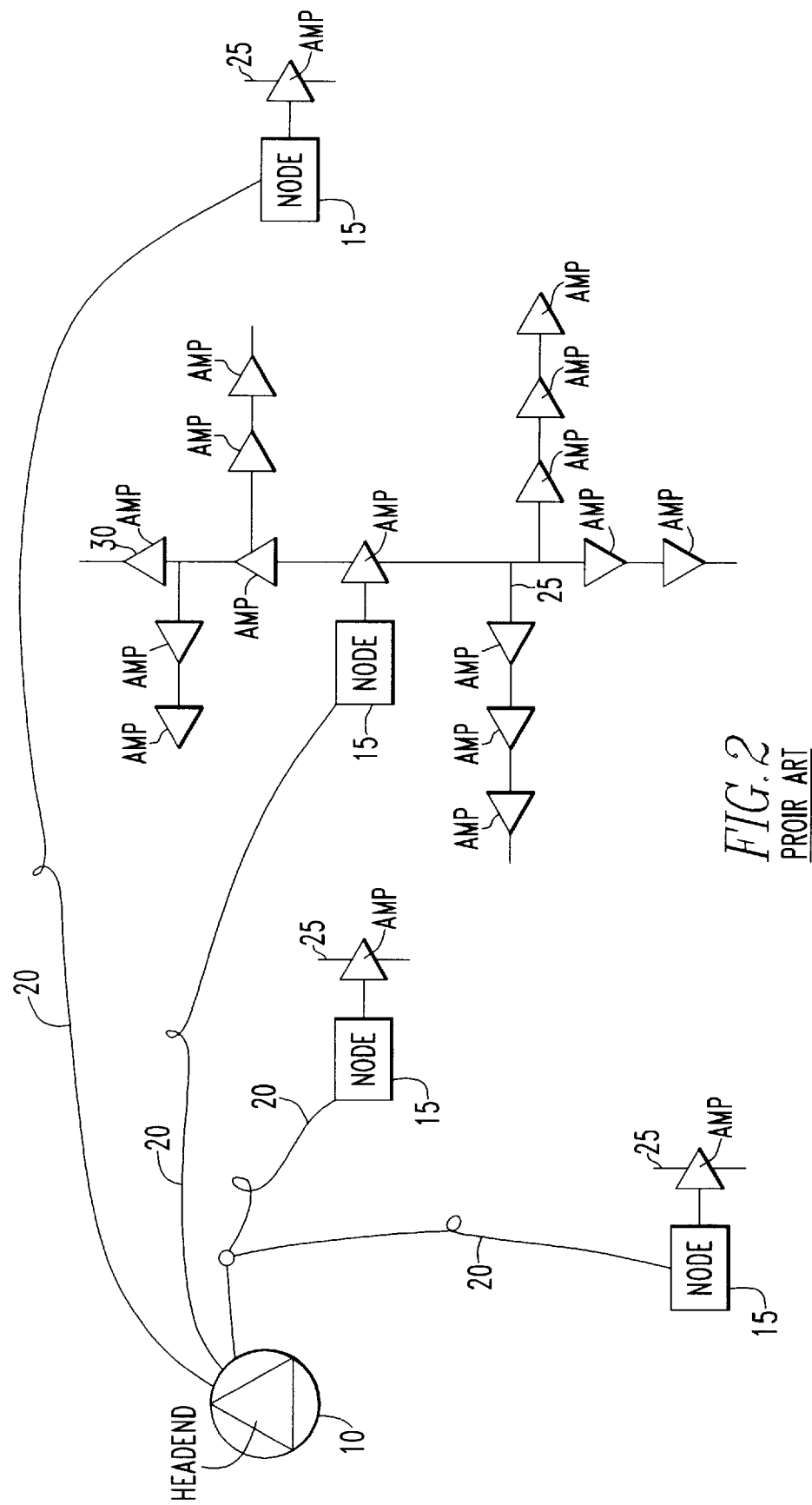
FIG. 2 shows a conventional fiber-to-feeder network architecture.
Figure 3:
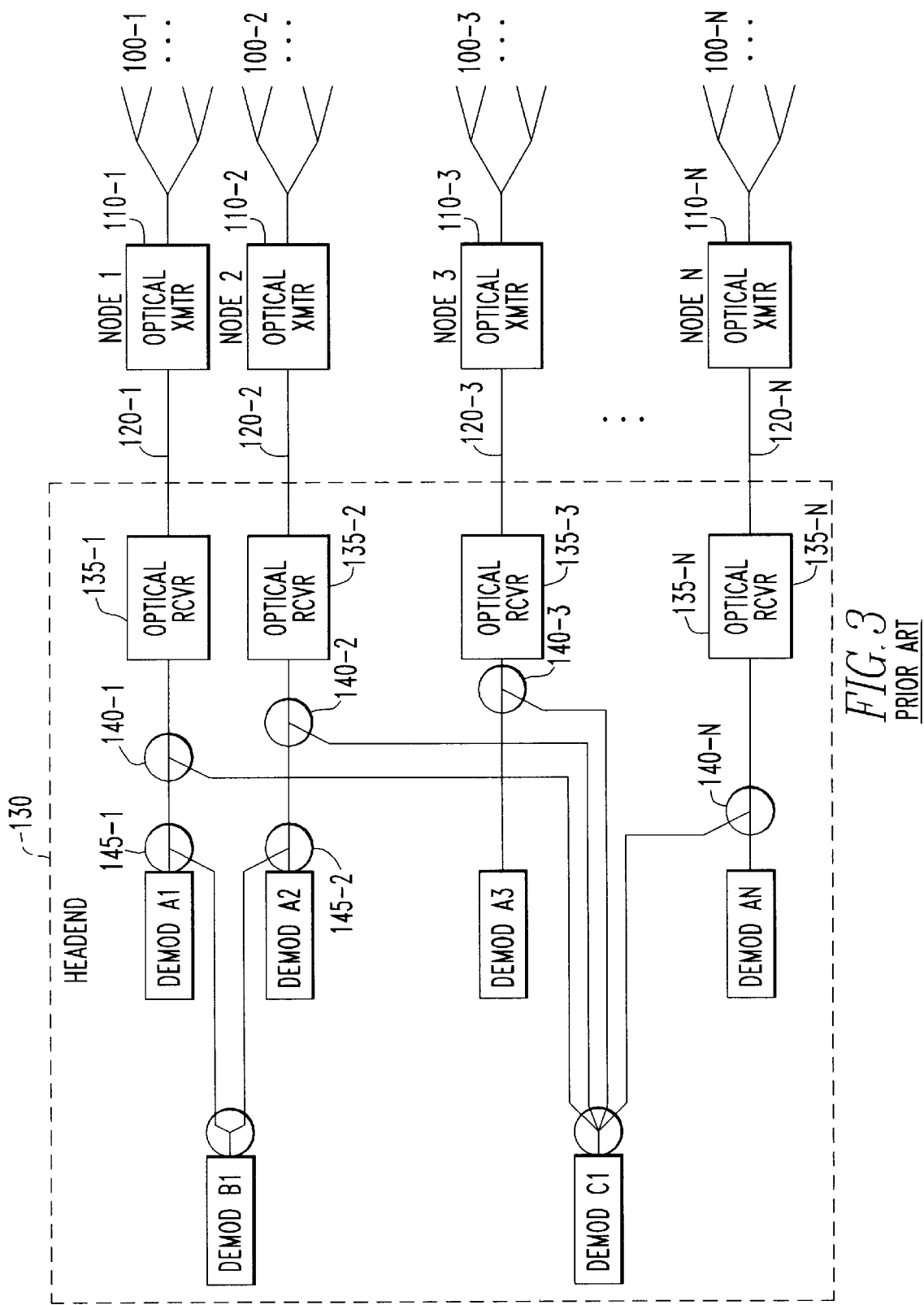
FIG. 3 shows a conventional HFC network architecture.
Figure 4:
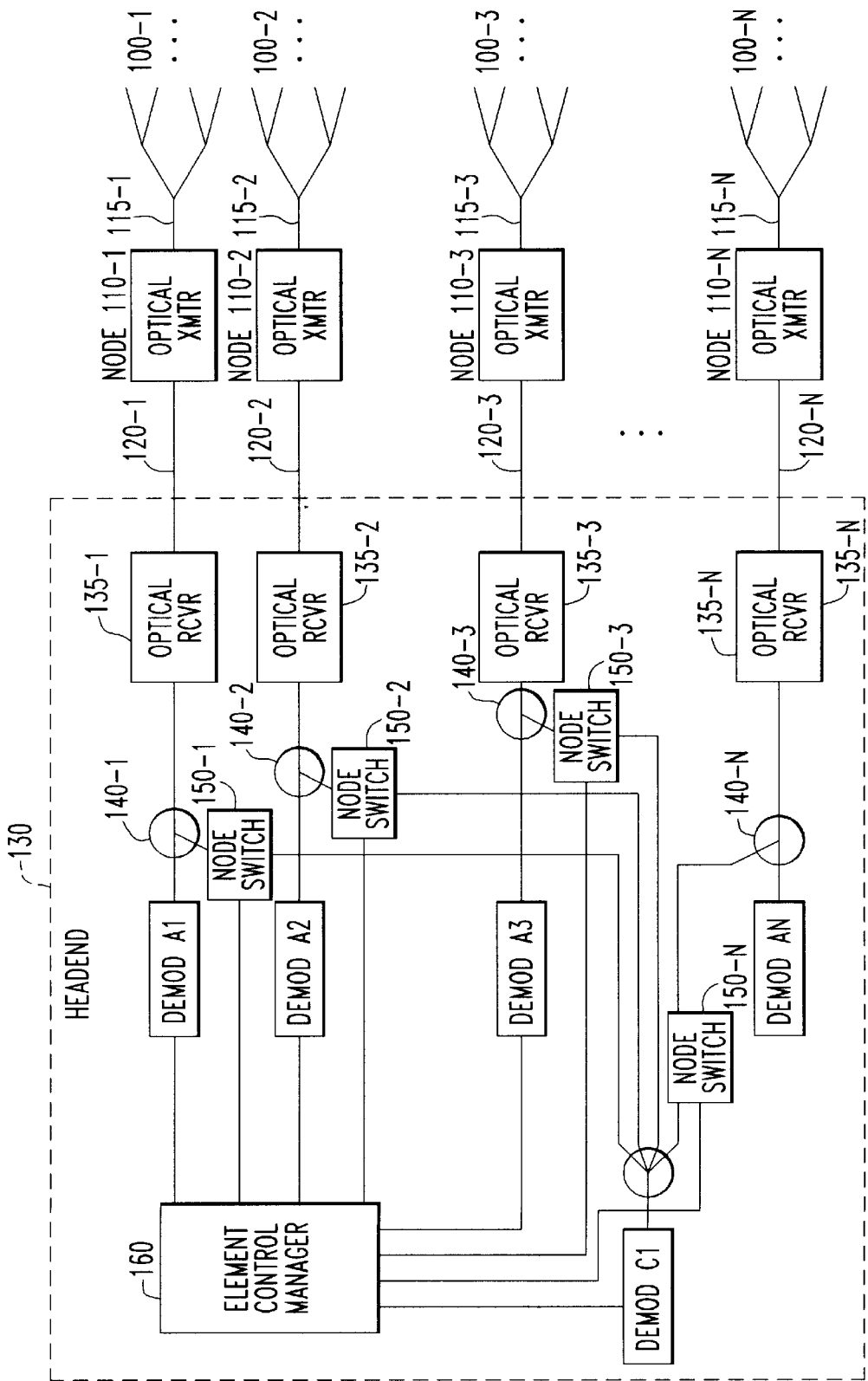
FIG. 4 shows an illustrative HFC network architecture according to the present invention.

According to the present invention, the bridger switch of the conventional coaxial architecture shown in FIG. 1 is moved from the coaxial distribution plant to the headend. FIG. 4 shows an HFC communications network according an illustrative embodiment of the present invention. A series of coaxial distribution plants 100-1, 100-2, 100-3, . . . , 100-N are coupled to subscribers (not shown). Coaxial cables 115-1, 115-2, 115-3, . . . , 115-N connect a corresponding optical node 110-1, 110-2, 110-3, . . . , 110-N to a corresponding coaxial distribution plant 100-1, 100-2, 100-3, . . . , 100-N. The number of nodes and corresponding coaxial distribution plants vary from network to network and typically depend on network requirements and/or capacity. In the illustrative network of FIG. 4, there are N nodes where N is an integer greater than three. Each node 110-1, 110-2, 110-3, . . . , 110-N includes an optical transmitter for optically transmitting upstream signals to the headend 130 on a corresponding fiber optic cable 120-1, 120-2, 120-3, . . . , 120-N.

In the headend 130, there are N optical receivers, 135-1, 135-2, 135-3, . . . , 135-N coupled to the respective N optical nodes 110-1, 110-2, 110-3, . . . , 110-N by N fiber optic cables 120-1, 120-2, 120-3, . . . , 120-N. RF coaxial cables distribute the optical signals received by the respective optical receivers within the headend 130. However, it should be understood that RF coaxial cabling is not the only means for communicating upstream signals within the headend. Other forms of communication include, but are not limited to, infrared, fiber optic, and wireless. According to the exemplary embodiment of FIG. 4, the optical receivers 135-1, 135-2, 135-3, . . . , 135-N pass the upstream signals to the RF directional couplers 140-1, 140-2, 140-3, . . . , 140-N by coaxial cables.

Each RF directional coupler divides the received signal power of an upstream signal between at least two different routes. For example, referring to the directional coupler 140-1, a first route delivers the upstream signal directly to a corresponding demodulator A1, which demodulates and processes the specific signal type received from the corresponding node 110-1 in the upstream signal path. In a second route, a node switch 150-1 when closed, connects the upstream signal to a demodulator C1. Opening the node switch 150-1 prevents the upstream signal from being coupled from the optical receiver 135-1 through the directional coupler 140-1 to the demodulator C1.

The directional coupler 140-2 divides an upstream signal from the optical receiver 135-2 between the demodulator A2 and the node switch 150-2. In a closed state, the node switch 150-2 connects an upstream signal received by the optical receiver 135-2 to the demodulator C1. In an open state, the node switch 150-2 disconnects the optical receiver 135-2 and demodulator C1.

The directional coupler 140-3 divides an upstream signal from the optical receiver 135-3 between the demodulator A3 and the node switch 150-3. In a closed state, the node switch 150-3 connects an upstream signal received by the optical receiver 135-3 to the demodulator C1. In an open state, the node switch 150-2 disconnects the optical receiver 135-2 and demodulator C1.

The directional coupler 140-N divides an upstream signal from the optical receiver 135-N between the demodulator AN and the node switch 150-N. In a closed state, the node switch 150-N connects an upstream signal received by the optical receiver 135-N to the demodulator C1. In an open state, the node switch 150-N disconnects the optical receiver 135-N and demodulator C1.

The demodulator C1 has a node switch on the input path from each node. The demodulator C1 receives a signal from one subscriber at any given time. Consequently, while receiving signals from one of the optical nodes (e.g., 110-1) through its corresponding optical receiver (e.g., 135-1), directional coupler (e.g., 140-1), and node switch (e.g., 150-2, 150-3, . . . , 150-N) on the inputs from the other nodes are open. Thus, noise from the other nodes is not permitted to corrupt the upstream signals from the one of the optical nodes (e.g., 110-1). An element control manager 160 controls the open and closed states of each node switch 150-1, 150-2, 150-3, . . . , 150-N in the headend 130. The node switches receive a control signal from the element control manager 160.

The demodulators A1, A2, A3, . . . , AN, and C1 can receive different upstream signals. The element control manager 160 also provides a control signal to each demodulator to demodulate the incoming signal via, for example, conventional RF switching circuitry. Functions performed by the demodulators may include, among others, assigning frequency allocation, transmission time, and message format. The element control manager assigns the task or tasks to be performed by the demodulators.

Each type of demodulator can have its own set of corresponding node switches in the upstream signal path. In such an arrangement, the operation of node switches to optimize noise performance for one type of reverse traffic will not affect the reception of other types of reverse traffic by other demodulators in the headend.

Typically, upstream signals are modulated with a reverse RF subcarrier. Exemplary upstream signal types include, but are not limited to, telephony, impulse pay-per-view (IPPV) information and other forms of data. In the above described system, the demodulator C1 which receives signals from each of the optical nodes may receive IPPV information in the form of burst communications from each subscriber. With IPPV information, it is not cost effective to employ dedicated modulators for each node or subscriber because information is only broadcast in small bursts periodically such that signals from other node subscribers can easily be processed between two burst communications from an individual subscriber or node. Some types of information, however, may require a dedicated modulator for each subscriber including telephony, where the length of the upstream communication can be extensive and must be transmitted in real time. Other information types, such as cable modem data, may be acceptable for several subscribers or nodes to share a single modulator. Often the decision as to how many modulators are necessary is both a cost and system performance issue.

Since the invention is directed to upstream communications from subscribers to the headend, the upstream portions of the system are shown. The downstream portion of the system includes the elements of a typical HFC network which are known by those skilled in the art.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A hybrid fiber coax communications system, comprising:

a coaxial distribution plant including coaxial distribution lines;

a plurality of nodes coupled to said coaxial distribution plant;

a plurality of fiber optic links including at least one fiber optic cable; and a headend coupled to said nodes by ones of said fiber optic links, said headend including:

optical receivers, each optical receiver for receiving an upstream signal from a corresponding one of said nodes, a first demodulator, selectively coupled to said optical receivers, for receiving one upstream signal at any given time from a first optical receiver, and a plurality of switches located in a signal path between said optical receivers and said first demodulator, a first switch being in a closed state to operatively connect said first optical receiver to said first demodulator, and second switches being in an open state to disconnect second optical receivers from said first demodulator; and an element control manager, coupled to said switches being in an open state to disconnect second optical receivers from said first demodulator.

2. The communications system according to claim 1, further comprising second demodulators, each second demodulator coupled to a corresponding one of said optical receivers and receiving the upstream signal.

3. The communications system according to claim 2, further comprising directional couplers connected to said optical receivers for routing the upstream signals to said switches and to said second demodulators.

4. A headend for receiving upstream signals from nodes coupled to a coaxial distribution plant, said headend comprising:

optical receivers, each optical receiver for receiving an upstream signal from a corresponding node;

a first demodulator, selectively coupled to said optical receivers, for receiving one upstream signal at any given time from a first optical receiver;

a plurality of switches located in a signal path between said optical receivers and said first demodulator, a first switch being in a closed state to operatively connect said first optical receiver to said first demodulator, and second switches being in an open state to disconnect second optical receivers from said first demodulator; and an element control manager, coupled to said switches, for generating a control signal to select one switch that is in the closed state.

5. The headend according to claim 4, further comprising second demodulators, each second demodulator coupled to a corresponding one of said optical receivers and receiving the upstream signal.

6. The headend according to claim 5, further comprising directional couplers connected to said optical receivers for routing the upstream signals to said switches and to said second demodulators.

7. A headend for receiving upstream signals over a fiber optic link, said headend comprising:

a first optical receiver for receiving a first upstream signal;

a second optical receiver for receiving a second upstream signal;

a first demodulator, selectively coupled to said first and second optical receivers;

a first switch located in a signal path between said first optical receiver and said first demodulator, for operatively connecting said first optical receiver to said first demodulator in a closed state and disconnecting said first optical receiver from said first demodulator in an open state; and a second switch located in a signal path between said second optical receiver and said first demodulator, for operatively connecting said second optical receiver to said first demodulator in a closed state and disconnecting said first optical receiver from said first demodulator in an open state.

8. The headend according to claim 7, wherein when the first switch is in the open state, the second switch is in the closed state, and when the first switch is in the closed state, the second switch is in the open state.

9. The headend according to claim 7, further comprising an element control manager, coupled to said first switch and said second switch, for controlling the open and closed states of said first and second switches.

10. The headend according to claim 7, further comprising:

a second demodulator coupled to said first optical receiver for receiving the first upstream signal; and a third demodulator coupled to said second optical receiver for receiving the second upstream signal.

11. The headend according to claim 10, further comprising:

a first directional coupler connected to said first optical receiver for routing the first upstream signal to said first switch and to said second demodulator; and a second directional coupler connected to said second optical receiver for routing the second upstream signal to said second switch and to said third demodulator.

12. A headend for receiving upstream signals over a fiber optic link, said headend comprising:

a first optical receiver for receiving a first upstream signal;

a second optical receiver for receiving a second upstream signal;

a first demodulator, selectively coupled to said first and second optical receivers;

a first switch located in a signal path between said first optical receiver and said first demodulator, for operatively connecting said first optical receiver to said first demodulator in a closed state and disconnecting said first optical receiver from said first demodulator in an open state; and an element control manager, coupled to said first switch, for controlling the open and closed states of said first switch.

13. In a headend, a method for processing upstream signals from a plurality of nodes, said method comprising the steps of:

receiving a first upstream signal from a first node and a second upstream signal from a second node;

routing the first upstream signal to a first switch;

routing the second upstream signal to a second switch;

selectively coupling the first upstream signal to first demodulating circuitry when the first switch is in a closed state and the second switch is in an open state;

selectively coupling the second upstream signal to the first demodulating circuitry when the second switch is in a closed state and the first switch is in an open state; and generating a control signal for controlling the first switch and the second switch.

14. The method according to claim 13, further comprising the steps of:

routing the first upstream signal to second demodulating circuitry; and routing the second upstream signal to third demodulating circuitry.

15. In a headend, a method for processing upstream signals from a plurality of nodes, said method comprising the steps of:

receiving a first upstream signal from a first node and a second upstream signal from a second node;

routing the first upstream signal to a switch;

selectively coupling the first upstream signal to first demodulating circuitry when the switch is in a closed state;

selectively coupling the second upstream signal to the first demodulating circuitry when the switch is in an open state; and generating a control signal for controlling the switch.

* * * * *